United States Patent [19]

Lowry et al.

[11] 4,186,556

[45] Feb. 5, 1980

[54] COMPRESSOR BLEED BIASED ACCELERATION SCHEDULE

[75] Inventors: William C. Lowry, West Chester; William L. Phipps, Cincinnati, both of Ohio

[73] Assignee: General Electric Company, Cincinnati, Ohio

[21] Appl. No.: 581,752

[22] Filed: May 29, 1975

[51] Int. Cl.² .............................................. F02C 9/02
[52] U.S. Cl. .................................... 60/39.03; 60/39.27
[58] Field of Search ................ 60/39.02, 39.03, 39.27, 60/39.29, 39.28 R

[56] References Cited

U.S. PATENT DOCUMENTS

| | | | |
|---|---|---|---|
| 2,930,520 | 3/1960 | Abild | 60/39.29 UX |
| 2,978,166 | 4/1961 | Hahn | 60/39.29 X |
| 3,006,145 | 10/1961 | Sobey | 60/39.29 |
| 3,080,712 | 3/1963 | Wood | 60/39.29 |
| 3,137,210 | 6/1964 | Gavin | 137/115 X |
| 3,172,259 | 3/1965 | North | 60/39.27 |
| 3,255,586 | 6/1966 | Hennig et al. | 60/39.27 |
| 3,513,899 | 5/1970 | Paduch | 60/39.29 X |
| 3,533,238 | 10/1970 | Marvin | 60/39.29 X |
| 3,727,400 | 4/1973 | Harrison | 60/39.29 |
| 3,849,020 | 11/1974 | Eastman | 60/39.27 X |
| 3,918,254 | 11/1975 | Wernberg | 60/39.28 R |
| 3,971,208 | 7/1976 | Schwent | 60/39.27 |

Primary Examiner—Robert E. Garrett
Attorney, Agent, or Firm—Dana F. Bigelow; Derek P. Lawrence

[57] ABSTRACT

Turbine engine power extraction and acceleration capabilities are enhanced by the sensing of the amount of air that is bled off from a compressor, and biasing the acceleration schedule in relation thereto. In this way the engine shaft power extraction and/or rotor acceleration capability can be maximized by enriching the acceleration fuel schedule when compressor bleed air is extracted. The selected degree of enrichment may be applied so as to consume the entire stall margin gain, whereby the engine is made to follow the same acceleration trajectory on a compressor map notwithstanding the degree of compressor bleed, or the degree of enrichment may be applied so as to obtain the desired performance level while retaining a portion of the gained stall margin.

6 Claims, 4 Drawing Figures

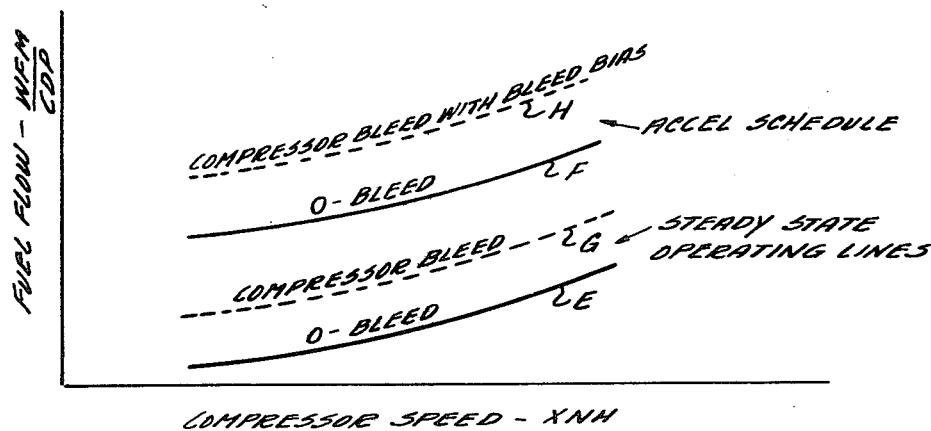
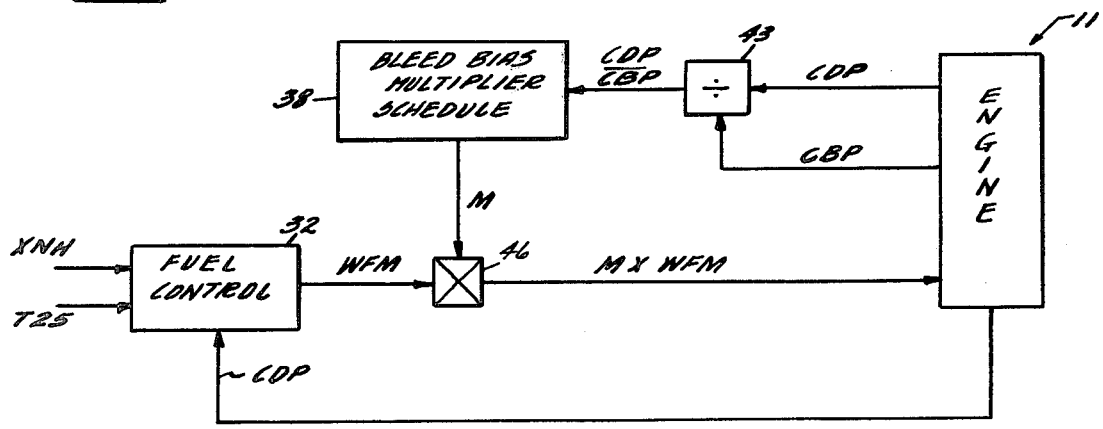

COMPRESSOR BLEED BIASED ACCELERATION SCHEDULE

The invention herein described was made in the course of or under a contract, or a subcontract thereunder, with the United States Department of the Air Force.

BACKGROUND OF THE INVENTION

This invention relates generally to gas turbine engines and, more particularly, to a method and apparatus for modifying the acceleration schedule in response to certain engine operating parameters.

In the control of jet engine operation it is common to limit the amount of rotor acceleration fuel to eliminate the possibility of compressor stall. This is generally done by way of maintaining an acceleration fuel schedule with controls that sense the factors which determine the compressor's capabilities to maintain stall-free compression ratio and limit the fuel flow accordingly. This acceleration fuel schedule, in addition to preventing excessive acceleration resulting in engine stall or excessive temperature, must permit the engine to meet predetermined acceleration times, and is therefore elevated to as high a degree as possible without exceeding safe limits.

In maintaining an acceleration fuel schedule, a parameter which has found wide acceptance in the art is that of the ratio of fuel flow (WFM) to compressor discharge pressure (CDP). This parameter works very well on most turbojet applications and on those turbofan applications where reasonable amounts of compressor bleed and power extraction are required, and where the flight envelope is somewhat restricted in altitude. However, when an engine is required to operate with large amounts of bleed (either compressor discharge bleed or compressor interstage bleed), then the WFM/CDP acceleration schedule designed to meet the standard criteria does not permit the desired amount of shaft power extraction or yield the required acceleration time during certain flight conditions. In fact, with some combinations of compressor bleed and shaft power extraction, the engine tends to "hang up" and be incapable of acceleration, or the engine's speed may "roll back" as both compressor bleed and the shaft power extraction are increased.

Various solutions have been proposed to accommodate higher power extraction and reduced acceleration time capabilities. The cycle can be designed so as to lower the compressor operating line or the compressor can be designed for a higher stall line and thus a higher acceleration schedule, but either of these results in an overall performance penalty. By another approach, the acceleration schedule can be designed for a high compressor bleed level with associated stall margin loss when the level of bleed is low, but this results in an unacceptable transient stall margin loss during periods of low bleed. By yet another method the acceleration schedule can be designed for a high compressor bleed level with a constant bleed which is either used or dumped overboard, but the dumping overboard of unwanted air results in a severe performance penalty.

It is well known that compressor bleed increases compressor stall margin. However, since the engine must be designed to operate safely during periods when the stall margin is at a minimum, the acceleration schedule is generally chosen to be compatible with a no-bleed condition. Since the bleeding of compressor air causes an increase in the stall margin, an engine operating under such a bleed condition will have a stall margin characteristic which is in excess of that required for safe operation, even during periods of acceleration.

It is, therefore, an object of this invention to provide a fuel control system for an engine adapted to operate at high altitudes with simultaneous high shaft power extraction and compressor bleed.

Another object of this invention is the provision for an acceleration schedule which meets the requirements of predetermined shaft power extraction and acceleration time at variable flight conditions.

Another object of this invention is to obtain increased acceleration capabilities during periods in which air is being bled from the compressor.

These objects and other features and advantages will become more readily apparent upon reference to the following description when taken in conjunction with the appended drawings.

SUMMARY OF THE INVENTION

Briefly, in accordance with one aspect of the invention, the compressor bleed is sensed and the acceleration fuel schedule is biased in proportion thereto to provide greater acceleration capabilities during that period of operation. Since the engine gains compressor stall margin with increased compressor bleed, the amount of available shaft power extraction or rotor acceleration torque is maximized by enriching the acceleration fuel schedule as a function of the sensed bleed. Of course, it must be kept in mind that the acceleration fuel schedule cannot be enriched without bounds, since the engine temperature limit could be exceeded without stalling the compressor at high bleed levels. Accordingly, the engine preferably has an additional control loop to limit the turbine temperature.

By another aspect of this invention, the degree of compressor bleed is approximated by sensing the compressor discharge static pressure (CDP) and the static pressure in the compressor bleed pipe (CBP), and taking the ratio of the two to derive a bleed flow characteristic. A multiplier may then be applied to the bleed flow characteristic to derive a bias signal to enrich the acceleration fuel schedule as desired. By using only enough enrichment to consume the stall margin gain, a constant acceleration trajectory will be maintained on the compressor map regardless of the amount of compressor bleed.

Although the present invention is described in terms of compensation for compressor discharge bleed, the invention is equally applicable to bleed from interstage ports. If the bleed is derived from compressor interstage, the applicable stage discharge pressure would be used in combination with the bleed pipe static pressure in the computation of the acceleration schedule multiplier.

In the drawings as hereinafter described, the preferred embodiment is depicted; however, various other modifications and alternate constructions can be made thereto without departing from the true spirit and scope of the invention.

BRIEF DESCRIPTION OF THE DRAWINGS

FIG. 3 is a graphic illustration of the acceleration fuel parameter for a turbofan engine showing the corrected fuel flow as a function of the corrected speed, either with or without the bleed bias of the present invention.

FIG. 4 is a schematic diagram of the preferred embodiment of this invention as it is applied to a typical turbofan engine.

DESCRIPTION OF THE PREFERRED EMBODIMENT

Figure 1:
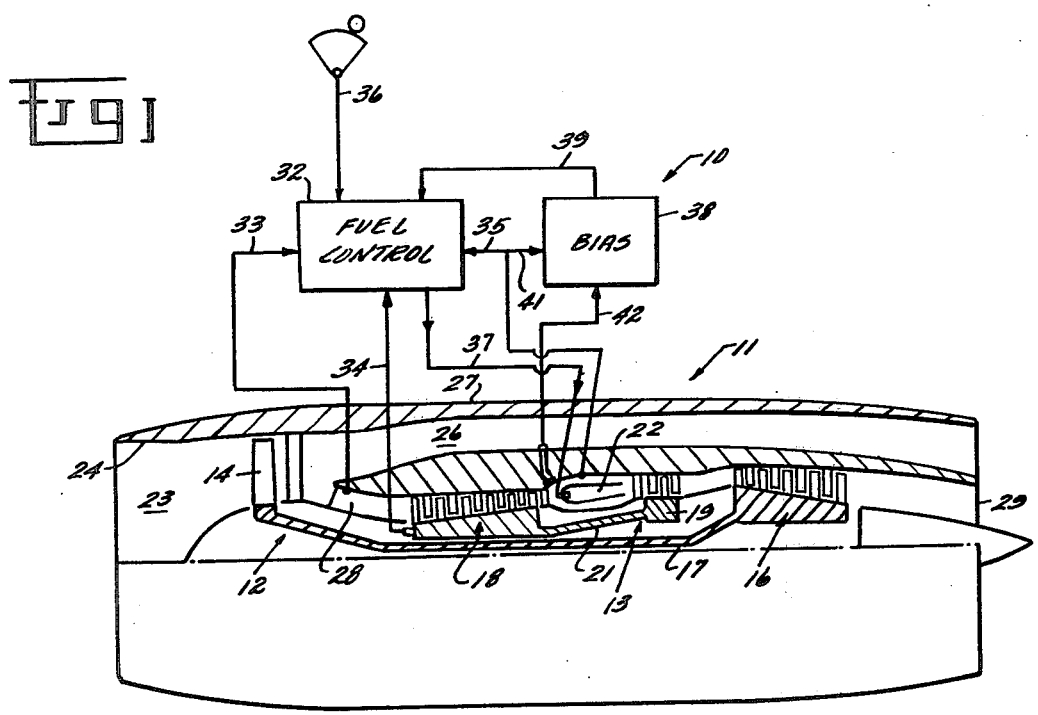
FIG. 1 is a schematic of a turbofan engine of the type in which the present invention is applicable.

Referring now to FIG. 1, the present invention is shown generally at 10 as applied to a turbofan engine 11 which includes a fan rotor 12 and a core engine rotor 13. The fan rotor 11 includes on its forward end a plurality of fan blades 14, and on its aft end a low pressure or fan turbine 16 which drives the fan blades through a turbine shaft 17 in a well-known manner. The core engine rotor 13 includes on its forward end a compressor 18 and on is aft end a power or high pressure turbine 19 which drives the compressor through the compressor shaft 21. Between the compressor and the turbine, there is provided a combustor 22 which combines the fuel with the air flow and ignites the mixture to inject thermal energy into the system.

In operation, air enters the gas turbine engine 11 through an air inlet 23 provided by means of a suitable cowling or nacelle 24 which surrounds the fan rotor 12. Air entering the inlet 23 is compressed by means of the rotation of the fan blades 14 and thereafter is split between an annular passageway 26 defined by the fan duct casing 24 and the core engine casing 27, and a core engine passageway 28 having its external boundary defined by the core engine casing 27. Pressurized air which enters the core engine passageway 28 is further pressurized by means of the compressor 18 and is thereafter ignited along with high energy fuel in the combustor 22. This highly energized gas stream then flows through the high pressure turbine 19 to drive the compressor 18 and thereafter through the fan turbine 16 to drive the fan blades 14. The gas is then passed out the main nozzle 29 to provide propulsion forces to the engine in a manner well known in the art. Additional propulsive force is gained by the exhaust of pressurized air from the annular passage 26.

A fuel control system 32 is provided to regulate the fuel flow through the combustor 22 so as to govern engine speed, control acceleration and deceleration rates, and compensate for altitude, compressor inlet temperature and compressor discharge pressure variations. The fuel control functions in response to compressor inlet temperature (T25), core engine speed (XNH), compressor discharge pressure (CDP) and power demand input, the signals being transmitted along lines 33, 34, 35 and 36, respectively. It will, of course, be understood that additional input signals may be provided to the fuel control system, or alternate signals can be used. For example, it is common to provide to the fuel control system a signal representative of the turbine gas temperature so as to limit the fuel flow to prevent excessive temperatures in the turbine. As another example, instead of sensing the core engine speed as described, the fan speed may instead be sensed and the representative signal applied to the fuel control system. In any case, the fuel control system 32 functions to regulate the flow of fuel to the combustor 22 by way of signals transmitted along line 37.

The present invention is concerned with the modification of the acceleration fuel flow schedule to obtain improved performance characteristics during certain periods of operation. The improvement includes a biasing apparatus 38 which receives signals representative of certain engine operating parameters, and delivers a resultant signal along line 39 to the fuel control system 32 to modify the fuel schedule accordingly. In order to accomplish the object of the present invention it is desirable that the bias apparatus 38 operates in response to the amount of air which is bled off from the compressor. This amount can be represented by the ratio of the compressor discharge static pressure (CDP) to the static pressure in the bleed pipe (CBP). These signals are, therefore, sensed in the engine and the representative signals are transmitted along lines 41 and 42, respectively. Operation of the biasing apparatus 38 will be more fully explained hereinafter.

Figure 2:
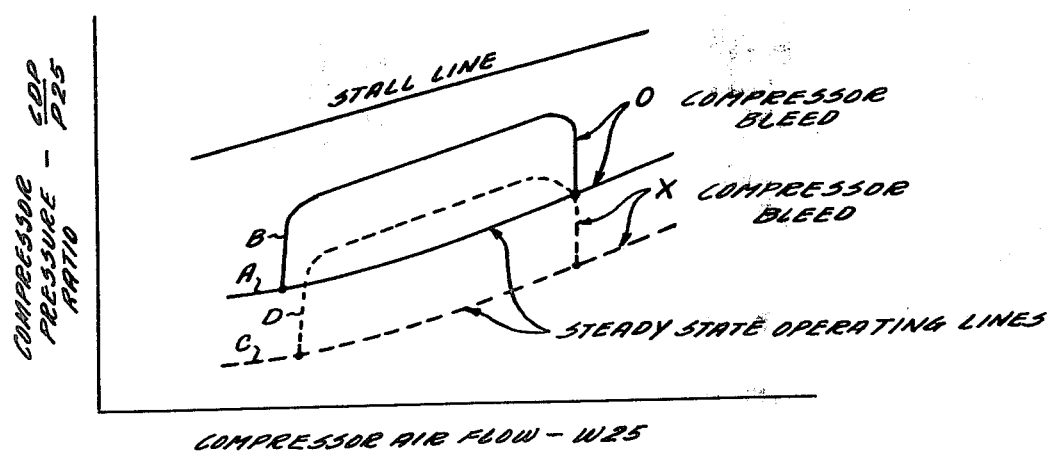
FIG. 2 is a compressor map for a typical turbofan engine showing the compressor pressure ratio as a function of the compressor air flow either with or without compressor discharge bleed.

Referring now to FIG. 2, a compressor map of a typical gas turbine engine is shown for both steady-state and accelerating periods of operation, and either with a certain amount of compressor bleed or without any bleed. The line A represents the steady-state operating line when no air is being bled off of the compressor. Line B represents operation of the engine during periods of acceleration without any compressor bleed, wherein rotor acceleration torque is increased and compressor stall margin is decreased. To ensure that the engine is always operating within the range of its capabilities, it is designed such that there always remains a given amount of compressor stall margin during an acceleration period with zero compressor bleed. This necessary stall margin is maintained by way of an acceleration schedule as shown in FIG. 3. Here the fuel flow during steady-state operation with zero bleed is shown by the line E, and the fuel flow schedule during acceleration with zero bleed is shown by the line F.

Referring back to FIG. 2, a second pair of graphs C and D represent the engine operation during steady-state and accelerating periods of operation, respectively, with a certain amount of air being bled off from the compressor. It will be noted that for a given amount of compressor bleed, the stall margin is increased for either stedy-state or accelerating periods of operation. It is this gain in stall margin which is occasioned by the bleeding of compressor air, that the present invention contemplates for use in obtaining increased performance capabilities. This is accomplished by enriching the fuel flow schedule as a function of the amount of air that is bled off, thereby consuming the stall margin that is gained but is not needed for safe and proper operation. It will be understood that if the fuel schedule is increased in such a manner as to consume the entire stall margin gain, then the engine will be made to follow the same acceleration trajectory on a compressor map regardless of whether there is bleed or not. Thi increased fuel schedules for steady-state and accelerating periods of operation are shown by the graphs G and H, respectively, in FIG. 3.

FIG. 4 is a schematic illustration which shows the biasing apparatus 38 as it is connected within the engine control system to modify the acceleration schedule in the manner desired. The fuel control apparatus 32 receives signals representative of engine operation parameters including the compressor speed (XNH), compressor inlet temperature (T25) and compressor discharge pressure (CDP) to obtain a typical WFM/CDP acceleration fuel schedule. Concurrently, the compressor discharge static pressure (CDP), and the static pressure in the compressor bleed pipe (CBP) are sensed and a ratio of the two is obtained by applying the signals to a conventional divider 43. The resultant CDP/CBP signal is then representative of the amount of air that is bled off the compressor. In particular, this ratio has been found to correspond very closely to the percent of compressor bleed flow (WB/W25 wherein WB equals the amount of air bled off and W25 represents the core air flow). The CDP/CBP signal is then received by the biasing apparatus 38 which applies an appropriate modification thereto to obtain a bias multiplier M for appropriately modifying the acceleration schedule. It has been found that an acceleration schedule multiplier which is equal to one plus the quantity of a constant times the compressor bleed ratio WB/W25, will maintain essentially a constant acceleration trajectory on the compressor map. An acceleration schedule multiplier calculated in this manner results in an increase in the acceleration schedule which is larger than the increase in the steady-state WFM/CDP due to the compressor bleed. Thus, it is possible to have a higher power extraction capability with bleed than without. Accordingly, the biasing multiplier is modified appropriately so as to maintain the desired margin between the steady-state fuel flow and the biased acceleration schedule for a given amount of compressor bleed.

It should be noted that although the above description is made in terms of an aircraft gas turbine engine, the present invention may be applicable to any gas turbine engine power plant such as that used for marine and industrial applications. The above description of the engine is thus merely illustrative of the type of engine to which the present invention is applicable.

While a preferred embodiment of the present invention has been depicted and described, it will be appreciated by those skilled in the art that many modifications, substitutions, and changes may be made thereto without departing from the true spirit and scope of the invention. For example, although the invention has been described in terms of use with a turbofan engine, it will be understood that it may just as well be used with a turbojet engine. Also, the invention may be applied to engines having a control mode other than that of a core speed schedule, as for example an engine controlled to a fan speed schedule.

Therefore, having described a preferred embodiment of the engine, what is desired to be secured by Letters Patent of the United States is as follows:

We claim:
1. An improved fuel control system for a turbine engine of the type having a compressor from which a portion of the air can be bled off and a fuel control system responsive to engine operating parameters wherein the improvement comprises:
 a. means for sensing the amount of air that is bled off from the compressor; and
 b. means for biasing the fuel control system as a function thereof to increase the acceleration fuel schedule.

2. The improved turbine engine as set forth in claim 1 wherein the sensing means includes a means for sensing the compressor discharge pressure at the bleed extraction stage and means for sensing the pressure in the compressor bleed pipe.

3. A method of regulating fuel flow in a gas turbine engine of the type having a fuel control system responsive to certain engine operating parameters comprising the steps of:
 a. bleeding off a portion of the compressor air;
 b. sensing the amount of air that is bled off; and
 c. enriching the acceleration fuel schedule as a function of the amount of air bled off.

4. A method of regulating fuel flow as set forth in claim 3 wherein the sensing of bleed air includes the steps of sensing the compressor bleed stage discharge static pressure and sensing the static pressure in the compressor bleed pipe.

5. A fuel flow regulating system for a gas turbine engine of the type adapted to have air selectively bled off from its compressor flow comprising:
 (a) means for sensing the amount of air that is so bled off; and
 (b) means for biasing the fuel flow schedule as a function thereof so as to enrich the flow of fuel.

6. A control for regulating the rate of fuel flow to the burners of a gas turbine having a compressor discharge section and having a valved bleed passage communicating with said compressor discharge section to deliver a variable amount of air from said compressor discharge section for auxiliary use, said control comprising a fuel regulating element displaceable to different positions to control the rate of fuel flow to said burners, and means for detecting the ratio between the pressure CDP in said compressor discharge section and the pressure CBP in said bleed passage and for causing said fuel regulating element to be displaced as a predetermined function of changes in said ratio.

* * * * *